July 5, 1949.    R. LEE    2,474,850
PROTECTIVE MEANS FOR CONTACTS
Filed Aug. 21, 1944
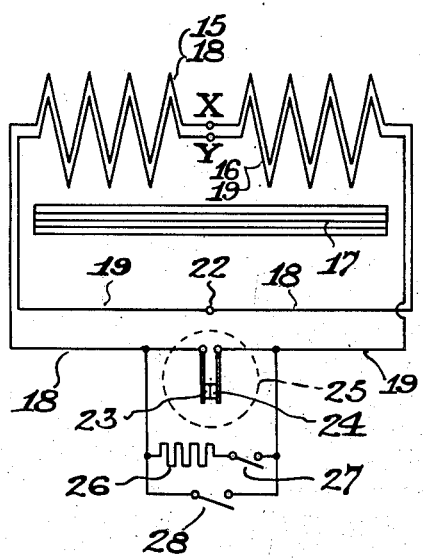
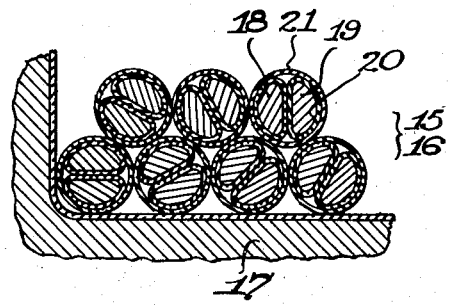
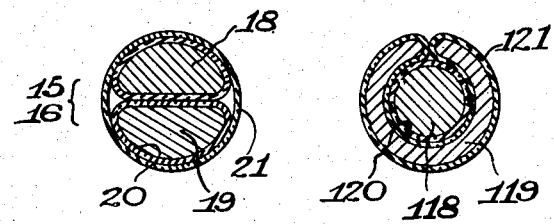
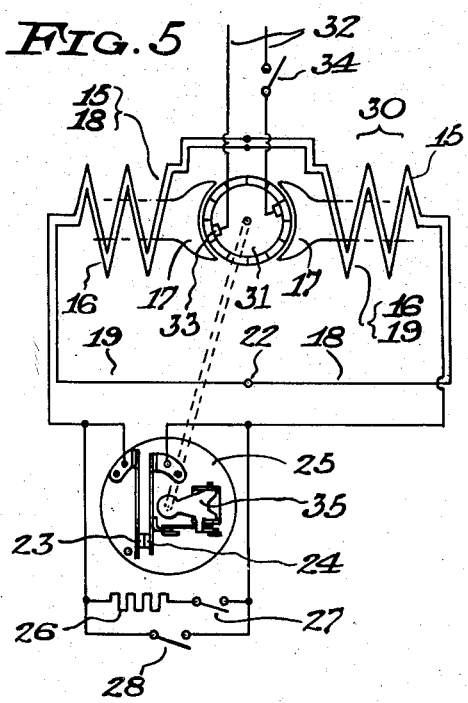
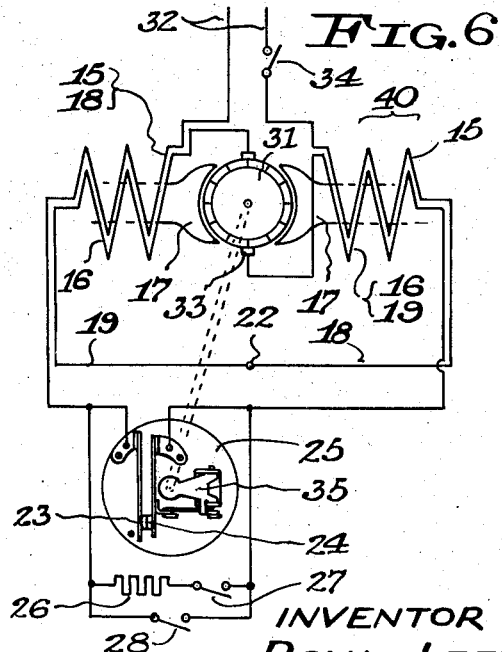
INVENTOR
ROYAL LEE
BY Christopher L. Waal
ATTORNEY Patented July 5, 1949

2,474,850

UNITED STATES PATENT OFFICE 2,474,850

PROTECTIVE MEANS FOR CONTACTS

Royal Lee, Milwaukee, Wis., assignor to Lee Engineering Research Corporation, Milwaukee, Wis., a corporation of Wisconsin Application August 21, 1944, Serial No. 550,351

3 Claims. (Cl. 318—325)

The present invention relates to electrical systems having contacts therein, and more particularly to protective arrangements for the contacts.

An object of the invention is to provide an improved electrical system having windings which are so arranged as to form spark suppressing means for electrical contacts in the system. The windings may form parts of various types of electrical apparatus, such as dynamo-electric machines and speed regulating means therefor.

Another object is to provide an electrical system in which the windings are arranged in series and are so related as to form an effective capacitor for minimizing sparking at the contacts and for improving the operation of the system.

Still another object is to provide an electrical motor having a speed regulating switch and having windings which are so arranged as to protect the switch contacts while permitting the use of the switch as an on-and-off switch for the motor.

A further object is to provide a novel form of winding adapted to shunt a switch and to form a spark-suppressing capacitor for the switch.

The invention further consists in the several features hereinafter described and claimed.

In the accompanying drawing,

Fig. 1 is a schematic representation of a contact-protecting electrical system arranged in accordance with the invention;

Fig. 2 is a transverse sectional view of a part of an inductive winding of the system;

Fig. 3 is a transverse sectional view of a twin wire or two-conductor cable for the winding of Fig. 2;

Fig. 4 is a transverse sectional view of a modified form of two-conductor cable;

Fig. 5 is a diagrammatic representation of the contact-protecting system applied to a repulsion-type electric motor with a speed-regulator switch; and Fig. 6 is a diagrammatic representation of the contact-protecting system applied to a series-type motor with a speed regulator switch.

In the system of Fig. 1, an electromagnetic structure is formed by a winding comprising coils 15 and 16 associated with a magnetizable member 17, the coils being magnetically additive and being connected in series. The winding may be formed in one or more sections. The coils 15 and 16 are closely coupled and are preferably formed by simultaneously winding two adjacent insulated conductors 18 and 19, such as those of Figs. 2 and 3, in bifilar relation, so as to provide a substantial electro-static capacity between the conductors. The two conductors are preferably in the form of a twin-wire cable, and for facility in winding, especially in the case of small wire sizes, the cable is generally circular in cross-section. As best seen in Fig. 3, each wire has an insulating covering or coating 20 and is of D-shape, the flattened portions of the two wires facing each other to increase the capacitance effect. The two wires of the cable are retained in assembled relation in any suitable manner, as by an insulating covering or wrapping 21, or merely by effecting adhesion between the two insulated wires. The cable is conveniently formed by a pair of round wires each having a tough coating of insulating enamel, the two wires being rolled, either individually or together, to produce the flattened shape. The rolling of the wires may be effected by means of suitable pressing and shaping rolls, not shown. The two wires are usually of the same size, as shown, but in some instances they may be of different size. In certain cases, the wires may have different conductivity. The wires are preferably formed of a metal of good electrical conductivity, such as copper or silver or silver-coated copper. In special cases, the wires may be formed of resistance alloys, in which event they are preferably plated or coated with copper or silver.

In the modified form of two-conductor cable shown in Fig. 4, a round wire 118 is snugly encased by a metal ribbon or strip 119 insulated therefrom, the wire preferably having a coating 120 of insulating enamel and the ribbon having a similar coating 121. The cable is approximately circular in cross-section to facilitate winding.

In connecting the two coils 15 and 16 in series, the finishing end of the wire 18 is connected to the starting end of the wire 19 to form a junction 22. The starting end of the wire 18 and the finishing end of the wire 19 are respectively connected to contacts 23 and 24 of a switch device 25 which in many instances may be of the centrifugally actuated type. The switch device operates periodically to interrupt the circuit through the coils 15 and 16, in which current is caused to flow in any suitable manner, as by induction or by direct connection with a source of supply, as hereinafter more fully described. For example, a voltage, either direct or alternating, may be introduced at the point X or Y. In some cases, the switch device may be shunted by a resistor 26 to pass some of the current, the resistor being normally open-circuited by a switch 27. In certain other cases, the switch device may be rendered ineffective at will by a short-circuiting switch 28. As will hereinafter appear, additional circuit elements may be introduced at the points X and Y of Fig. 1, these points being at the middle of the coil, or between the coil sections.

In operation, current flowing in the coils 15 and 16 will be periodically interrupted at the switch contacts 23 and 24. Any sparking tending to occur at the contacts will be suppressed or minimized by the condenser action of the winding, the condenser or capacitor formed by the coils of the winding being, in effect, shunted across the switch contacts. When the contacts are open, the circuit through the coils is completely open. This permits the switch device to be used as an on-and-off switch in addition to its normal function. When the switch 28 is closed, the capacity of the winding increases the power factor in the case of alternating current operation.

In Fig. 5, the system of Fig. 1 is applied to an electric motor 30 of the inverted repulsion type wherein the coils 15 and 16 form a stationary secondary winding on a stator core 17. The stator core forms pole pieces cooperating with an armature or rotor 31 to which current is supplied from alternating current mains 32 by means of brushes 33, the mains including a control switch 34. The circuit through the series-connected coils is periodically interrupted at the contacts 23 and 24 of the switch device 25, which in the present instance forms a speed-regulating governor switch operated by the motor. The switch contacts may be rotative or non-rotative, as is well understood in this art. In the case of a governor switch with rotative contacts the current is conducted to the contacts by the usual brushes and slip rings. One suitable form of governor switch is shown in my United States Patent No. 1,767,146, issued June 24, 1930. This switch includes a bell-crank actuator lever 35 by which the speed-setting may be adjusted while the motor is running.

In operation, the mean value of the secondary current, and therefore the line current, is controlled by the governor switch, maintaining the motor speed within close limits. The contact 23 vibrates a high frequency, say from 50 to 300 cycles per second, so as to obtain good speed regulation. Excessive sparking will be suppressed by the capacitor-forming coils 15 and 16. The secondary circuit when closed includes the capacity of the winding, which improves the power factor of the motor.

In Fig. 6, the protective system is applied to an electric motor 40 of the series of universal type wherein the coils 15 and 16 form field coils on pole pieces 17, the two composite field coils being identical. The motor includes an armature 31 having a commutator with brushes 33 bearing thereon, and is supplied with current, either direct or alternating, from mains 32 which include a control switch 34. The coil sections 15 are opened at the point X of Fig. 1 for connection to the mains, and the coil sections 16 are opened at the point Y of Fig. 1 for connection to the armature brushes. The governor switch is connected to the coils 15 and 16 as in the system of Fig. 1.

In the operation of the motor of Fig. 6, current flows from the right-hand line conductor through the right-hand coil section 15, the left-hand coil section 16, armature 31, right-hand coil section 16, governor switch 25, left-hand coil section 15, and to the left-hand line conductor. This causes rotation of the armature at a speed determined by the speed-setting of the governor switch 25. Sparking at the governor switch contacts is prevented or minimized by the capacitor-forming coils. If desired, the governor switch may be used as an on-and-off switch as the motor circuit is entirely open when the governor contacts are open. When the motor is operated on alternating current, the capacitor-forming coils also tend to improve the power factor.

What I claim as new and desire to secure by Letters Patent is:

1. In an electrical system, an electric motor having a field winding and an armature, said field winding comprising a pair of conductors wound together in bifilar relation to form a pair of field coils each having a substantial capacitance effect, said conductors being connected in series aiding relation and in series with the armature, said armature forming a series connection between the ends of conductors of said two field coils, a source of current connected to the corresponding ends of the other conductors of said two field coils, and a speed-responsive switch having separable contacts connected in series with said coil-forming conductors at ends thereof remote from the armature and the source of current.

2. In an electrical system, a circuit having a pair of coil sections comprising a pair of conductors wound together in bifilar series-aiding relation to provide a substantial capacitance effect, a source of current connected in one of said conductors at a point between said coil sections, one end of said conductor being connected to the opposite end of the other conductor, and separable contacts one of which is connected to the other end of said first conductor, and the other contact being connected to the remote end of the second conductor.

3. In an electrical system, a circuit having a pair of first and second coils each comprising a pair of first and second conductors wound together in bifilar series-aiding relation to provide a substantial capacitance effect at each coil, a source of current connected between one end of the first conductor of the first coil and one end of the first conductor of the second coil, the corresponding ends of the second conductors of said coils having an electrical connection, the end of the first conductor of the second coil remote from the source of current being connected to the end of the second conductor of the first coil remote from said electrical connection, and separable contacts one of which is connected to the end of the first conductor of the first coil remote from the source of current, and the other contact being connected to the end of the second conductor of the second coil remote from said electrical connection.

ROYAL LEE.

REFERENCES CITED

The following references are of record in the file of this patent:

UNITED STATES PATENTS

| Number | Name | Date |
| --- | --- | --- |
| 825,222 | Latour | July 3, 1906 |
| 841,545 | Latour | Jan. 15, 1907 |
| 1,460,390 | O'Leary | July 3, 1923 |
| 1,765,958 | Wick | June 24, 1930 |
| 2,078,896 | Hanley | Apr. 27, 1937 |
| 2,182,083 | Jepson et al. | Dec. 5, 1939 |